United States Patent [19]

Schechter

[11] 4,231,285
[45] Nov. 4, 1980

[54] VARIABLE RATE ANEROID CAPSULE

[75] Inventor: Michael M. Schechter, Southfield, Mich.

[73] Assignee: Ford Motor Company, Dearborn, Mich.

[21] Appl. No.: 967,531

[22] Filed: Dec. 7, 1978

[51] Int. Cl.³ .......................... F01B 19/00; F16J 3/04
[52] U.S. Cl. ............................................. 92/34; 92/42
[58] Field of Search .................. 267/122, 177; 92/132, 92/34, 40, 41, 43, 42; 139/79, 81

[56] References Cited

U.S. PATENT DOCUMENTS

| 1,408,208 | 2/1922  | Jones       | 92/43 X  |
| 2,695,629 | 11/1954 | Ribley      | 92/13.2  |
| 3,155,109 | 11/1964 | Anthon      | 267/177 X |
| 3,367,244 | 2/1968  | Charter     | 92/13.2  |
| 3,529,908 | 9/1970  | Smith       | 92/13.2  |
| 4,066,091 | 1/1978  | Itoh et al. | 92/40    |

*Primary Examiner*—Irwin C. Cohen
*Attorney, Agent, or Firm*—Robert E. McCollum; Clifford L. Sadler

[57] ABSTRACT

The figure shows a variable rate aneroid capsule consisting of a bellows 24 sealed with vacuum inside and having helically formed convolutions 22 defining an outer helical threaded surface 20 that is matingly engageable with the helical threaded surface 18 of a nut 14 that is axially slidably but non-rotatably mounted in a stationary housing 10; the bellows having end shafts 30 and 32 extending rotatably through the housing for connection of shaft 30 to a device to be moved linearly, and for connection of shaft 32 through an adjustably mounted sleeve 38 to a lever 42 for rotating the bellows to progressively engage the convolutions with the nut 14 to render the engaged convolutions inactive by preventing expansion or contraction of the engaged convolutions and thereby reducing the number of active unengaged convolutions to thereby vary the stroke and spring rate of the bellows for the same pressure differential across the surface of the bellows.

7 Claims, 1 Drawing Figure

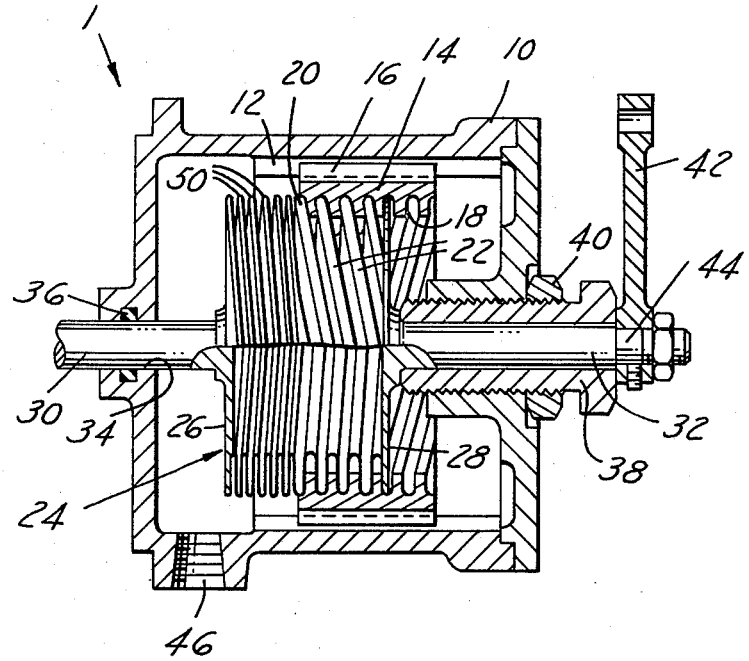

VARIABLE RATE ANEROID CAPSULE

This invention relates in general to the construction of an aneroid capsule. More particularly, it relates to one having a variable spring rate that is adjustable at will to vary the stroke of the aneroid for the same differential pressures acting on the bellows of the aneroid.

This invention relates to aneroid capsules of the metal bellows type closed at both ends and containing vacuum sealed inside. Such a capsule may contain additional springs inside, but in its simplest form the bellows acts as a spring so that when the aneroid capsule is subjected to a variable external gas pressure the capsule contracts or expands according to external pressure variations. With one end of the capsule fixed, the other moves as a function of external pressure. This translatory motion or travel of the capsule end is used in various control mechanisms. See, for example, the patents to Ribley, U.S. Pat. No. 2,695,629, and Jones, U.S. Pat. No. 1,408,208. Each shows a bellows having one end linearly movable by a differential pressure applied to the bellows. The capsule travel is directly proportional to the external pressure force and inversely proportional to the capsule spring rate.

Since the spring rate of the capsule is determined by such geometric factors as the diameter of the bellows, size and shape of the convolutions, metal thickness, and the number of active convolutions, and these factors usually do not change during the capsule operation, the spring rate of a conventional aneroid capsule is constant. Therefore, if such a capsule, exposed to variable external gas pressure, is coupled directly to the controlled component of the mechanism, the stroke of the said controlled component is a linear function of the gas pressure variation. That is:

$$S = K_s A \Delta P \quad (1)$$

Where:
S = controlled component stroke
Ks = capsule spring rate
A = effective area of the capsule
ΔP = change in gas pressure In many control mechanisms such a relationship is satisfactory. In some cases, however, the rate at which the gas pressure change is to be transformed into the controlled component stroke has to be varied. This problem is usually resolved by incorporating an intermediate mechanism with a variable mechanical ratio between the aneroid capsule and the controlled component. See, for example, Smith, U.S. Pat. No. 3,529,908, utilizing a variable ratio mechanism between a standard bellows 52 and the mechanism to be moved. In this case, the relationship expressed by equation (1) between the controlled component stroke and the gas pressure becomes:

$$S = K_m K_s A \Delta P \quad (2)$$

Where: Km = variable mechanical ratio of the intermediate mechanism

Varying the ratio Km varies the rate at which the gas pressure change ΔP is transformed into the controlled component stroke S. It is clear, however, that if the spring rate Ks of the aneroid capsule could be made variable, there would be no need for the intermediate variable rate mechanism. Such an aneroid capsule is the subject of this invention; that is, one with a variable spring rate that can be coupled directly to the controlled component without any intermediate mechanism and still be capable of transforming the gas pressure variation into the controlled component stroke at various rates that can be controlled by controlling the spring rate of the capsule.

It is, therefore, a primary object of this invention to provide an aneroid capsule construction having a variable spring rate capable of providing different strokes of the bellows for the same differential pressure acting on the bellows.

It is a further object of the invention to provide a variable rate aneroid capsule in which the convolutions of the bellows are helical rather than the conventional annular, and means are provided to selectively render some of the convolutions inactive by preventing the expansion or contraction of certain of the convolutions to change the stroke and, therefore, the spring rate of the bellows.

It is another object of the invention to provide an aneroid capsule construction of the type described above consisting of a bellows with vacuum sealed inside and having helically formed convolutions providing a helically threaded external surface that matingly engages a helical internal surface of an axially movable nut non-rotatably mounted in the housing surrounding the bellows; and selectively operable means to rotate the bellows relative to the nut to progressively engage the individual convolutions with the nut to prevent expansion or contraction of the engaged portions and thereby decrease the number of active convolutions remaining that determine the stroke and spring rate of the bellows.

Other objects, features, and advantages of the invention will become more apparent upon reference to the succeeding detailed description thereof, and to the single FIGURE of the drawing illustrating the preferred embodiment thereof in a cross-sectional view.

The aneroid capsule is indicated as a whole at 1 and includes an outer hollow stationary housing or shell 10 having internal axially extending splines 12. Mounted on splines 12 for an axial sliding movement relative to the housing is a nut element or member 14 having mating splines 16. The nut is formed internally with a male helical threaded surface 18 that is adapted to be engaged matingly by the helically threaded surface 20 defined by a plurality of individual helically formed convolutions 22 of a bellows 24. The bellows 24 in this case, is made of metal and sealed and evacuated with vacuum inside. The opposite ends of the bellows are cemented or otherwise fixed to a pair of end plates 26 and 28 formed integral with a pair of end shafts 30 and 32.

Shaft 30 extends rotatably through an opening 34 in housing 10 having an annular seal 36. Shaft 30 in this case would be connected to the mechanism to be moved linearly upon movement of bellows 24 in response to a differential pressure change on opposite sides of the convolutions.

Shaft 32 is rotatably mounted in a sleeve 38 that is threadedly mounted in housing 10 as indicated to permit axial adjustment. A jam nut 40 when tightened locates the sleeve 38 in a fixed position. The shaft 32 has an actuating lever 42 secured on a reduced end 44 of the shaft. The lever 42 can be actuated manually or automatically by a mechanism not shown in response to various operating demands, to rotate shaft 32 and the bellows 24.

The housing 10 is sealed but has an opening 46 adapted to be connected to a source of pressure such as, for example, the manifold vacuum in the intake manifold of an internal combustion engine. When so connected, the introduction of manifold vacuum at a level below the level of the vacuum in bellows 24 will cause a differential pressure to exist across the convolutions 22 of the bellows and cause an axial expansion of those plurality of convolutions 50 that are not engaged with the nut 14. The latter convolutions, therefore, constitute the active part of the bellows and upon expansion under pressure axially move the shaft 30 to define a predetermined stroke or travel and, therefore, a predetermined spring rate. The remaining convolutions 22 that are engaged with the nut 14 are prevented from a changed axial movement by expanding or contracting by the mere fact of engagement. Therefore, these latter convolutions are, in effect, inactive.

To vary the stroke or travel of the bellows and, therefore, the spring rate of the aneroid, lever 42 can be rotated in either direction to rotate the bellows relative to the nut 14. Since the nut 14 is prevented from rotating relative to the housing 10 by the interengaging splines 12 and 16, rotation of the bellows will maintain the bellows stationary axially but the nut 14 will move axially to progressively engage more and more of the individual convolutions 22 as the lever 42 is rotated. Thus, more and more of the convolutions are rendered inactive or prevented from expanding or contracting, providing less and less remaining convolutions 50 that determine the stroke and spring rate of the bellows.

Adjustment of the bellows and nut as a unit assembly may be made by backing off the jam nut 40 and threading the sleeve 38 inwardly or outwardly to reposition the assembly.

From the foregoing, it will be seen that the invention provides a simple construction of an aneroid capsule that has a variable spring rate without the necessity of providing an intermediate variable ratio mechanism between the output of the aneroid and the device to be actuated.

While the invention has been shown and illustrated in its preferred embodiment, it will be clear to those skilled in the arts to which it pertains that many changes and modifications may be made thereto without departing from the scope of the invention. For example, it will be clear that the bellows need not be sealed with vacuum inside but could be sealed with a superatmospheric pressure or pressure at a different level so long as the source of pressure in the housing is sufficient to provide a differential pressure across the convolutions to permit the operation described and desired.

I claim:

1. A variable rate aneroid capsule comprising a sealed bellows having a plurality of axially expandable and contractible convolutions defining a predetermined spring rate to the bellows providing a stroke varying as a linear function of the change in differential pressure level acting on the convolutions, the convolutions being helically formed to define an externally threaded helical surface, means to prevent expansion or contraction in either direction of certain ones of the total convolutions to vary the bellows spring rate and thereby provide a different linear stroke of the bellows for the same differential pressure level acting on the convolutions, said means to prevent expansion or contraction comprising an element having an internally threaded surface mounted for mating engagement with selected ones of the external surfaces of the convolutions, and means providing relative rotation between the bellows and external surface for progressively threading convolutions of the bellows into engagement with the external surface.

2. An aneroid capsule as in claim 2, the last mentioned means being selectively operable.

3. An aneroid capsule as in claim 2, including an outer stationary housing, means mounting the element within the housing for an axial non-rotatable slidable movement relative to the housing, and means connected to the bellows for rotating the same relative to the element.

4. An aneroid capsule as in claim 3, including axially extending spline means interconnecting the housing and element, the element having male threads engageable with female threads defined by the convolution helically formed external surfaces, means mounting the bellows for rotation within the housing, and lever means connected to the bellows for rotating the bellows.

5. An aneroid capsule as in claim 4, including means to adjust the axial positions of the bellows and element relative to the housing.

6. An aneroid capsule as in claim 5, wherein the means to adjust comprises a sleeve member threadedly engaging the housing, a shaft rotatably mounted in the sleeve member, and means fixedly connecting the lever means to one end of the shaft and fixedly connecting the opposite end of the shaft to the bellows.

7. A variable rate aneroid capsule comprising in combination, a stationary hollow-sealed housing, a nut splined within the housing for an axial sliding but non-rotatable movement relative to the housing, the nut having an internally threaded helically formed surface, an annular sealed bellows having a plurality of helically formed axially expandable and contractible convolutions defining a helically threaded external surface mateable with the internal surface of the nut, a shaft extending axially from opposite sides of the bellows and rotatable through the housing, one of the shafts being adapted to be connected to a member to be linearly moved, axially adjustable sleeve means between the other shaft and housing mounting the other shaft for rotation in the housing, lever means fixed to the other of the shafts for rotating the shafts and convolutions of the bellows progressively into engagement with the threaded surface of the nut to prevent expansion and contraction of the engaged bellows convolutions, a variable source of pressure connected to the interior of the housing for providing a differential pressure between the interior and exterior surfaces of the convolutions to permit expansion or contraction of the convolutions not engaged with the nut to thereby define a spring rate and linear stroke of the bellows, rotation of the lever means and bellows in one direction or the other to thread more or less convolutions into or out of engagement with the nut threaded surface varying the number of convolutions that are expandable or contractible and thereby varying the spring rate and stroke of the bellows for the same differential pressure levels acting on the convolutions.

* * * * *